(12) United States Patent
Hwang et al.

(10) Patent No.: US 7,708,521 B2
(45) Date of Patent: May 4, 2010

(54) THERMAL MODULE WITH CENTRIFUGAL BLOWER AND ELECTRONIC ASSEMBLY INCORPORATING THE SAME

(75) Inventors: Ching-Bai Hwang, Taipei Hsien (TW); Ran Lin, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsein (TW)

( * ) Notice: Subject to any disclaimer, the term of this patent is extended or adjusted under 35 U.S.C. 154(b) by 652 days.

(21) Appl. No.: 11/561,359

(22) Filed: Nov. 17, 2006

(65) Prior Publication Data

US 2008/0117594 A1 May 22, 2008

(51) Int. Cl.
*F04D 25/08* (2006.01)
(52) U.S. Cl. .................. 415/203; 415/102
(58) Field of Classification Search ........... 415/203, 415/206, 101, 102, 177, 178, 175; 417/354, 417/423.1, 423.14; 361/679.47, 679.48, 361/695, 696, 697
See application file for complete search history.

(56) References Cited

U.S. PATENT DOCUMENTS 6,654,245 B2 11/2003 Kawashima et al.
6,917,521 B2 * 7/2005 Tomioka et al. ............. 361/695

FOREIGN PATENT DOCUMENTS

JP 2001057493 A * 2/2001
TW 450375 8/2001

* cited by examiner

*Primary Examiner*—Edward Look
*Assistant Examiner*—Dwayne J White
(74) *Attorney, Agent, or Firm*—Frank R. Niranjan

(57) ABSTRACT

An electronic assembly includes an enclosure including a top cover and a bottom cover, and a thermal module arranged between the top cover and the bottom cover of the enclosure. The thermal module includes a centrifugal blower and a fin assembly arranged in an air outlet of the centrifugal blower. The centrifugal blower includes a top lid defining a first air inlet therein, a bottom plate defining a second air inlet therein, a sidewall disposed between the top lid and the bottom plate, with the air outlet defined in the sidewall, and a rotor disposed in an inner space formed between the top lid, the bottom plate and the sidewall. The bottom plate is separated by a distance from the bottom cover of the enclosure. The bottom plate defines an indent therein so as to widen the distance.

17 Claims, 5 Drawing Sheets ns of blades of the blower, the configuration of the casing of the blower, and the parameters of the motor of the blower. However, the design and the manufacture of these components complicate the design and the manufacture of the centrifugal blower and further increase the cost thereof. Therefore, a centrifugal blower capable of cheaply providing a large amount of airflow is needed.

THERMAL MODULE WITH CENTRIFUGAL BLOWER AND ELECTRONIC ASSEMBLY INCORPORATING THE SAME

BACKGROUND OF THE INVENTION

1. Field of the Invention

The present invention relates generally to a centrifugal blower, and more particularly to a thermal module using the centrifugal blower and an electronic assembly incorporating the thermal module.

2. Description of Related Art

It is well known that heat is produced by electronic components such as integrated circuit chips during normal operation. If this heat is not quickly removed, these electronic components may overheat. Therefore, thermal modules are often used to cool these electronic components.

As an example, a thermal module in accordance with related art generally includes a fin assembly having a plurality of fins, a centrifugal blower for creating an airflow through the fin assembly, and a heat pipe having an evaporating section which is kept in thermal contact with a heat generating electronic component such as a central processing unit (CPU) of a laptop computer, and a condensing section to which the fin assembly is attached. The heat pipe transfers heat from the heat generating electronic component which is thermally connected with the evaporating section thereof, to the fin assembly which is thermally attached to the condensing section of the heat pipe. The heat is then dissipated into ambient atmosphere via the airflow flowing through the fin assembly.

Increasing the amount of the airflow provided by the centrifugal blower is an effective way to improve the heat dissipation efficiency of the thermal module. Conventional ways of satisfying such requirement are to change the configurations of blades of the blower, the configuration of the casing of the blower, and the parameters of the motor of the blower. However, the design and the manufacture of these components complicate the design and the manufacture of the centrifugal blower and further increase the cost thereof. Therefore, a centrifugal blower capable of cheaply providing a large amount of airflow is needed.

SUMMARY OF THE INVENTION

The present invention relates, in one respect, to a centrifugal blower capable of providing a high volume of airflow, in another respect, to a thermal module using the centrifugal blower, and in a third respect, to an electronic assembly incorporating the thermal module. According to a preferred embodiment of the present invention, the electronic assembly includes an enclosure including a top cover and a bottom cover, and a thermal module arranged between the top cover and the bottom cover of the enclosure. The thermal module includes a centrifugal blower and a fin assembly arranged at an air outlet of the centrifugal blower. The centrifugal blower includes a top lid defining a first air inlet therein, a bottom plate defining a second air inlet therein, a sidewall disposed between the top lid and the bottom plate and defining the air outlet therein, and a rotor disposed in an inner space formed between the top lid, the bottom plate and the sidewall. The bottom plate is separated by a distance from the bottom cover of the enclosure. The bottom plate defines an indent therein so as to widen the distance.

Other advantages and novel features of the present invention will become more apparent from the following detailed description of preferred embodiment when taken in conjunction with the accompanying drawings, in which:

DETAILED DESCRIPTION OF THE INVENTION

Figure 5:
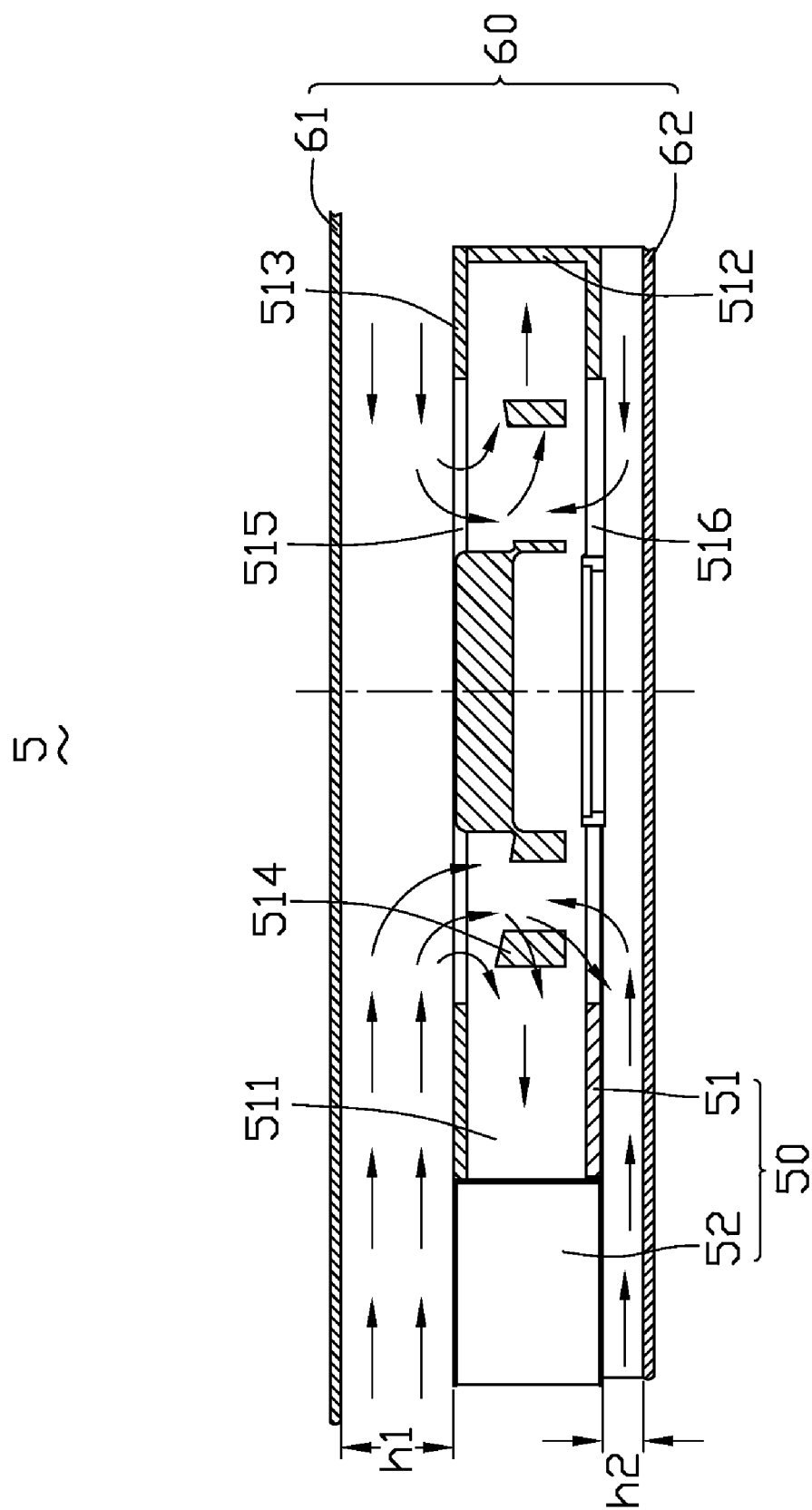
FIG. 5 is cross sectional view of an electronic assembly in accordance with a related art containing a thermal module and an enclosure of an electronic product.

Referring to FIG. 5, an electronic assembly 5 in accordance with a related art is shown. The electronic assembly 5 includes a thermal module 50 and an enclosure 60 of an electronic product (not shown) such as a laptop computer, a desktop computer, or a DVD player. The enclosure 60 includes a top cover 61 and a bottom cover 62. The thermal module 50 is mounted between the top cover 61 and the bottom cover 62, and includes a centrifugal blower 51 and a fin assembly 52. The fin assembly 52 is arranged in an air outlet 511 of the centrifugal blower 51 and thermally connects with a heat-generating electronic component (not shown) of the electronic product to absorb heat therefrom. The centrifugal blower 51 includes a bottom housing 512 and a top lid 513 covering the bottom housing 512. A rotor 514 is rotatably disposed in an inner space formed between the top lid 513 and the bottom housing 512, for driving airflow through the fin assembly 52 to take away heat therefrom. The top lid 513 and the bottom housing 512 of the centrifugal blower 51 respectively define a first and a second air inlet therein 515, 516. The first and second air inlets 515, 516 are round-shaped in profile. A diameter of the first air inlet 515 is equal to a diameter of the second air inlet 516. The air enters into the centrifugal blower 51 via the first and second air inlets 515, 516.

When the thermal module 50 is assembled in the enclosure 60 of the electronic product, there are tiny distances formed between the top cover 61 and bottom cover 62 of the enclosure 60 and the respective top lid 513 and bottom housing 512 of the thermal module 50, i.e., a first distance h1 formed between a bottom surface of the top cover 61 of the enclosure 60 and a top surface of the top lid 513 of the centrifugal blower 51, and a second distance h2 formed between a top surface of the bottom cover 62 of the enclosure 60 and a bottom surface of the bottom housing 512 of the centrifugal blower 51. In the electronic product, the thermal module 50 is usually arranged in a position which makes the first distance h1 greater than the second distance h2. When the flow field of the airflow was simulated using computational fluid dynamics (CFD) software it was found that the amount of the air entering into the centrifugal blower 51 via the first air inlet 515 is more than that of the air entering into the centrifugal blower 51 via the second air inlet 516. That is, the greater the distance between the bottom surface of the top cover 61 of the enclosure 60 and the top surface of the top lid 513 of the centrifugal blower 51 the more air there is entering into the centrifugal blower 51. Therefore, widening the distance between the top surface of the bottom cover 62 of the enclosure 60 and the bottom surface of the bottom housing 512 of the centrifugal blower 51 so as to increase the amount of the air entering into the centrifugal blower 51 is feasible. This is the guiding concept of the present invention.

Referring to FIGS. 1 through 4, a thermal module 10 according to a preferred embodiment of the present invention is shown. The thermal module 10 is mounted in an enclosure 20 of an electronic product (not shown) such as a laptop computer, a desktop computer, or a DVD player so as to build an electronic assembly 1. The enclosure 20 includes a top cover 21 and a bottom cover 22. The thermal module 10 is mounted between the top cover 21 and the bottom cover 22 and includes a centrifugal blower 12 and two linear-shaped fin assemblies 14. The fin assemblies 14 are arranged at two linear-shaped air outlets 132 of the centrifugal blower 12 and thermally connect with a heat-generating electronic component (not shown) of the electronic product via a heat transfer element (not shown) such as a heat pipe.

The centrifugal blower 12 includes a top lid 121, a bottom plate 122, a sidewall 123 perpendicularly and upwardly extending from a periphery of the bottom plate 122, and a rotor 124 disposed in an inner space formed between the top lid 121, the bottom plate 122 and the sidewall 123. The air outlets 132 are defined in the sidewall 123. The rotor 124 includes a hub 125 and a plurality of blades 126 radially extending from a periphery wall of the hub 125. Each of the blades 126 includes a pyramid portion 126a disposed between an inner portion 126b and an outer portion 126c thereof. The pyramid portion 126a makes the outer portion 126c of the blade 126 wider than the inner portion 126b of the blade 126 along a central axis of the hub 125.

The top lid 121 and the bottom plate 122 are planar plates and respectively define first and second air inlets 127, 128 therein. The first and second air inlets 127, 128 are round-shaped in profile. A diameter of the second air inlet 128 is greater than a diameter of the first air inlet 127. The air enters into the centrifugal blower 12 via the first and second air inlets 127, 128. A first distance H1 formed between a bottom surface of the top cover 21 of the enclosure 20 and a top surface of the top lid 121 of the centrifugal blower 12 is greater than a second distance H2 formed between a top surface of the bottom cover 22 of the enclosure 20 and a bottom surface of the bottom plate 122 of the centrifugal blower 12.

Figure 1:
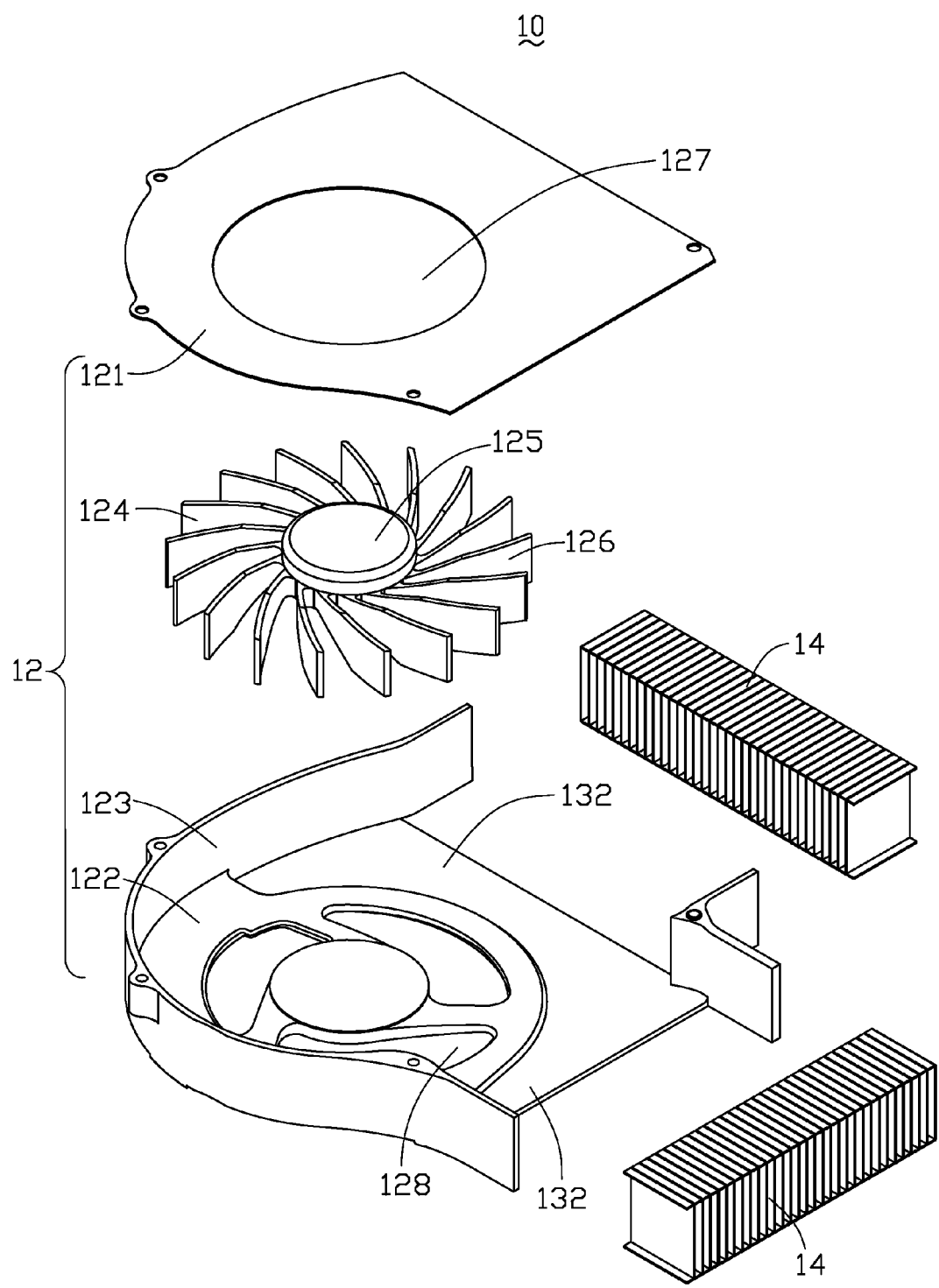
FIG. 1 is an exploded, isometric view of a thermal module according to a preferred embodiment of the present invention.
Figure 2:
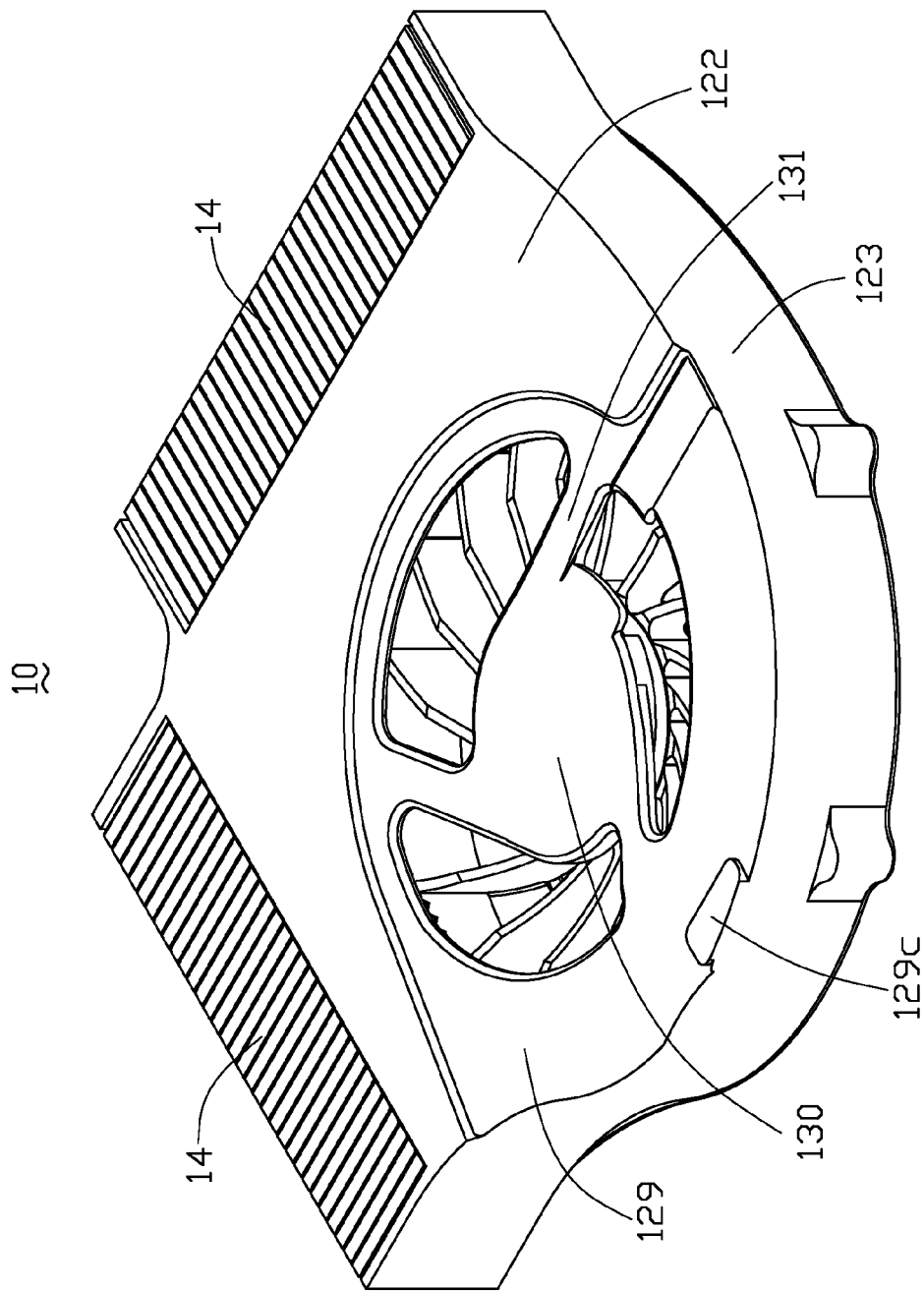
FIG. 2 is an assembled view of the thermal module of FIG. 1.
Figure 3:
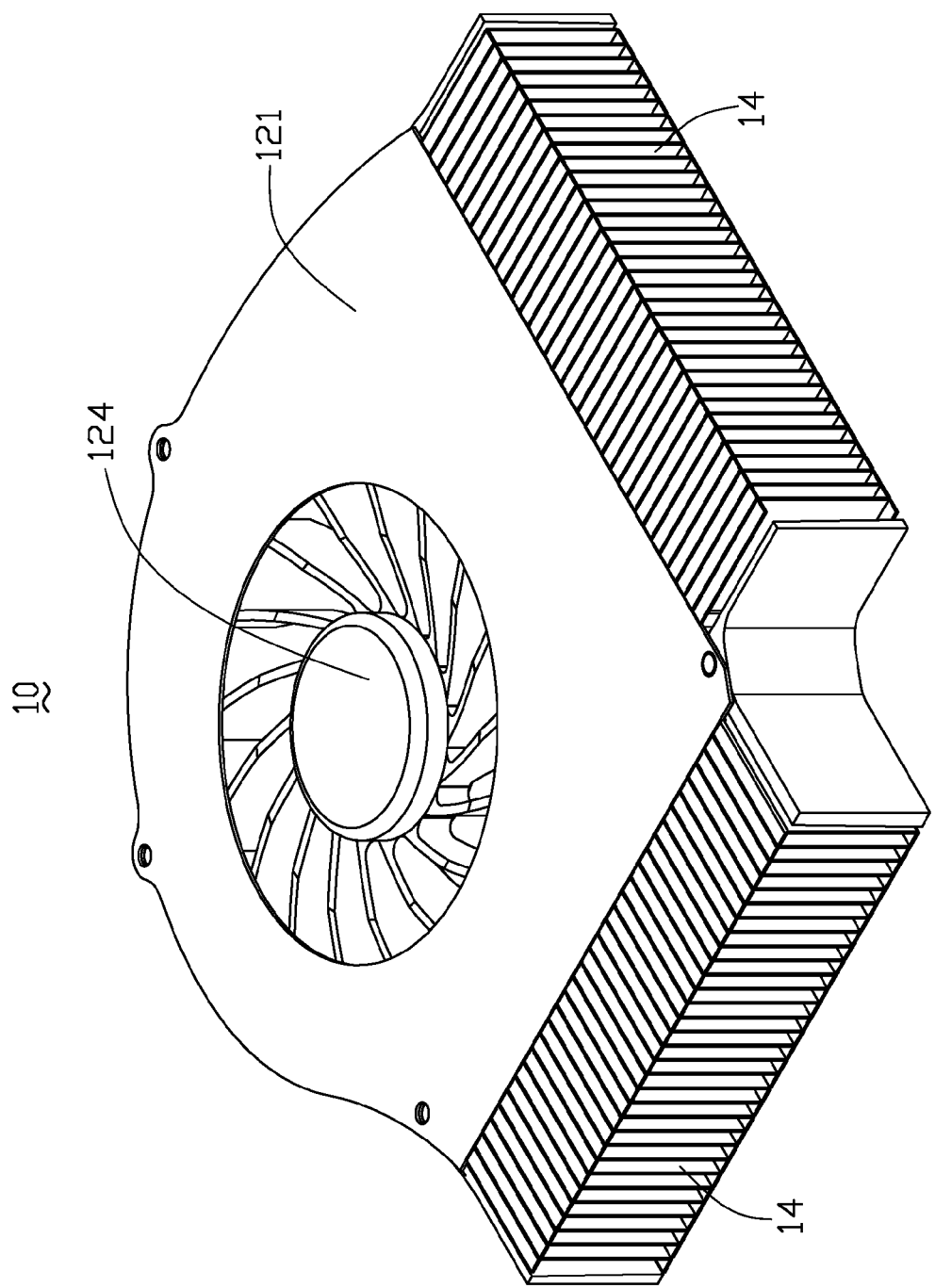
FIG. 3 is similar to FIG. 2, but viewed from another aspect.
Figure 4:
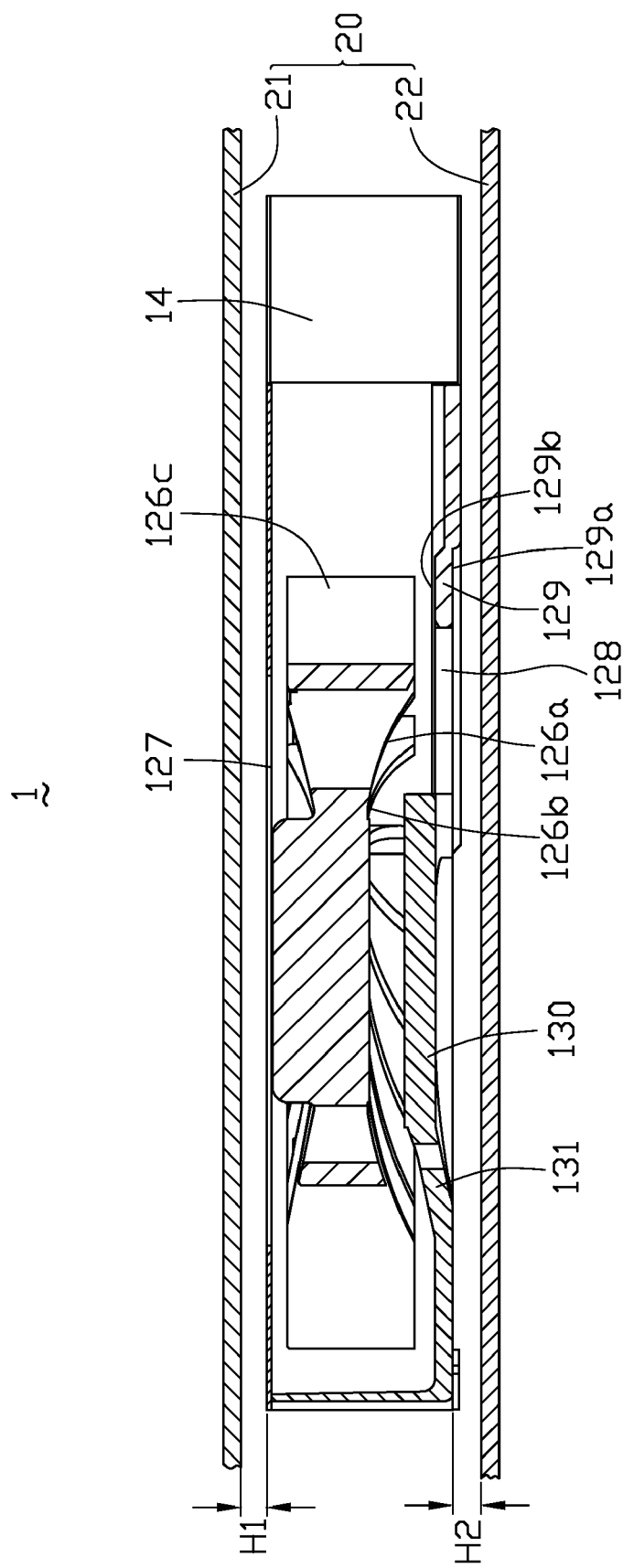
FIG. 4 is a cross sectional view of an electronic assembly containing the thermal module of FIG. 3 and an enclosure of an electronic product.

The bottom plate 122 defines an indent portion 129 surrounding the second air inlet 128 of the centrifugal blower 12. The indent portion 129 is perpendicularly pressed toward the bottom surface of the top lid 121, thereby forming an indent 129a in the bottom surface of the bottom plate 122 and a protrusion 129b on a top surface of the bottom plate 122. The bottom plate 122 further includes a bulge 129c projecting from the indent 129a and disposed adjacent to an edge of the bottom plate 122. A bottom surface of the bulge 129c is coplanar with a bottom surface of a portion of the bottom plate 122 which surrounds the indent 129a, so as to statically mount the centrifugal blower 12 onto the bottom cover 22 of the enclosure 20. The bottom plate 122 includes a rounded supporting portion 130 disposed in the second air inlet 128 of the centrifugal blower 12 for support of the rotor 124. Three slantwise ribs 131 extend from a periphery of the supporting portion 130 towards the bottom plate 122 so as to connect the supporting portion 130 with the bottom plate 122. A bottom surface of the supporting portion 130 is a bit higher than a top surface of the indent portion 129 as shown in FIG. 4. The rotor 124 is mounted on the supporting portion 130 with a top of the supporting portion 130 accommodated in a space formed between the pyramid portions 126a of the blades 126. When the rotor 124 is mounted on the supporting portion 130, a bottom end of the inner portion 126b of each blade 126 is higher than a bottom end of the corresponding outer portion 126c. The indent portion 129 widens the second distance H2 around the second air inlet 128 so that the second distance H2 thereat is substantially equal to the first distance H1.

In the present centrifugal blower 12, the indent portion 129 widens the second distance H2 around the second air inlet 128 which is formed between a bottom surface of the supporting portion 130 of the bottom plate 122 and the top surface of the bottom cover 22 of the enclosure 20 of the electronic product. In addition, the diameter of the second air inlet 128 is greater than the diameter of the first air inlet 127. Therefore, more airflow is allowed to enter into the centrifugal blower 12 via the second air inlet 128. Accordingly, the total amount of the airflow entering into the centrifugal blower 12 is increased without increasing the size of the centrifugal blower 12. Consequently, the heat dissipation efficiency of the thermal module 1 0 is increased, which prevents the electronic product from being damaged by the heat generated by the heat-generating electronic component. Moreover, the indent portion 129 is just pressed toward the top lid 121 of the centrifugal blower 12, which simplifies the manufacture of the centrifugal blower 12 and therefore decreases the cost of the centrifugal blower 12.

In the present centrifugal blower 12, the diameter of the second air inlet 128 is greater than the diameter of the first air inlet 127. Alternatively, the diameter of the first air inlet 127 may be equal to the diameter of the second air inlet 128.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A centrifugal blower comprising:
a top lid defining a first air inlet therein;
a bottom plate defining a second air inlet therein, and comprising a supporting portion disposed in the second air inlet, an indent portion surrounding the second air inlet, the supporting portion being located higher than the indent portion and a plurality of slantwise ribs connecting the supporting portion with the indent portion, the indent portion forming an indent in a bottom surface of the bottom plate and a protrusion on a top surface of the bottom plate;
a sidewall disposed between the top lid and the bottom plate, and defining an air outlet therein; and
a rotor disposed in an inner space formed between the top lid, the bottom plate and the sidewall, for driving air entering into the centrifugal blower via the first and second air inlets and leaving the centrifugal blower via the air outlet.

2. The centrifugal blower as described in claim 1, wherein the first and second air inlets are round-shaped in profile, and a diameter of the first air inlet is equal to a diameter of the second air inlet.

3. The centrifugal blower as described in claim 1, wherein the first and second air inlets are round-shaped in profile, and a diameter of the second air inlet is greater than a diameter of the first air inlet.

4. The centrifugal blower as described in claim 1, wherein the top lid and the bottom plate of the centrifugal blower are planar plates.

5. The centrifugal blower as described in claim 1, wherein the indent portion is pressed from the bottom surface of the bottom plate toward the top surface of the bottom plate.

6. The centrifugal blower as described in claim 1, wherein the supporting portion supporting the rotor, a bottom surface of the supporting portion being higher than a top surface of the indent portion.

7. The centrifugal blower as described in claim 1, wherein the rotor includes a hub and a plurality of blades radially extending from a periphery wall of the hub, a bottom end of an inner portion of each blade being higher than a bottom end of a corresponding outer portion of each blade.

8. A thermal module comprising:
 a centrifugal blower comprising a top lid defining a first air inlet therein, a bottom plate defining a second air inlet therein, a supporting portion disposed in the second air inlet and an indent portion surrounding the second air inlet, the supporting portion being located higher than the indent portion and a plurality of slantwise ribs connecting the supporting portion with the indent portion, a sidewall disposed between the top lid and the bottom plate and defining an air outlet therein, and a rotor disposed in an inner space formed between the top lid, the bottom plate and the sidewall; and
 a fin assembly arranged at the air outlet of the centrifugal blower.

9. The thermal module as described in claim 8, wherein the first and second air inlets are round-shaped in profile, and a diameter of the second air inlet is greater than a diameter of the first air inlet.

10. The thermal module as described in claim 8, wherein the indent is formed by pressing a portion of the bottom plate surrounding the second air inlet towards the top lid of the centrifugal blower.

11. The thermal module as described in claim 8, wherein the rotor includes a hub and a plurality of blades radially extending from a periphery wall of the hub, a bottom end of an inner portion of each blade being higher than a bottom end of a corresponding outer portion of each blade.

12. The thermal module as described in claim 8, wherein a bottom surface of the supporting portion being higher than a top surface of the indent portion.

13. An electronic assembly comprising:
 an enclosure comprising a top cover and a bottom cover; and
 a thermal module arranged between the top cover and the bottom cover of the enclosure, comprising:
 a centrifugal blower and a fin assembly arranged in an air outlet of the centrifugal blower, the centrifugal blower comprising:
 a top lid defining a first air inlet therein;
 a bottom plate defining a second air inlet therein, the bottom plate being separated by a first distance from the bottom cover of the enclosure, wherein the bottom plate defines an indent therein so as to widen the first distance;
 a sidewall disposed between the top lid and the bottom plate and defining the air outlet therein; and
 a rotor disposed in an inner space formed between the top lid, the bottom plate and the sidewall, wherein the top lid is separated by a second distance from the top cover of the enclosure, the second distance being greater than the first distance.

14. The electronic assembly as described in claim 13, wherein the indent is defined surrounding the second air inlet.

15. The electronic assembly as described in claim 13, wherein a distance formed between a bottom surface of the indent and a top surface of the bottom cover is substantially equal to a distance formed between a top surface of the top lid and a bottom surface of the top cover.

16. The electronic assembly as described in claim 13, wherein the first and second air inlets are round-shaped in profile, and a diameter of the first air inlet is equal to a diameter of the second air inlet.

17. The electronic assembly as described in claim 13, wherein the first and second air inlets are round-shaped in profile, and a diameter of the second air inlet is greater than a diameter of the first air inlet.

* * * * *